(12) United States Patent
Gibbs et al.

(10) Patent No.: US 11,400,780 B2
(45) Date of Patent: Aug. 2, 2022

(54) HIGH SPEED ACTUATION SYSTEM, APPARATUS AND METHOD FOR PROTRACTING AND RETRACTING A RETRACTABLE WHEEL ASSEMBLY OF AN AMPHIBIAN

(71) Applicant: Gibbs Technologies Limited, Warwickshire (GB)

(72) Inventors: Alan Timothy Gibbs, London (GB); Simon James Longdill, Warwickshire (GB)

(73) Assignee: Gibbs Technologies Limited, Nuneaton (GB)

( * ) Notice: Subject to any disclaimer, the term of this patent is extended or adjusted under 35 U.S.C. 154(b) by 0 days.

(21) Appl. No.: 15/768,166

(22) PCT Filed: Oct. 17, 2016

(86) PCT No.: PCT/GB2016/053215
§ 371 (c)(1),
(2) Date: Apr. 13, 2018

(87) PCT Pub. No.: WO2017/064521
PCT Pub. Date: Apr. 20, 2017

(65) Prior Publication Data
US 2018/0304709 A1    Oct. 25, 2018

(30) Foreign Application Priority Data
Oct. 15, 2015  (GB) ...................................... 1518288

(51) Int. Cl.
*B60F 3/00*         (2006.01)
*B60G 11/18*        (2006.01)
(Continued)

(52) U.S. Cl.
CPC .......... *B60F 3/003* (2013.01); *B60F 2301/04* (2013.01); *B60G 11/18* (2013.01); *B60G 11/27* (2013.01);
(Continued)

(58) Field of Classification Search
CPC .. B60F 3/003; B60F 2301/04; B60G 2300/28; B60G 2202/13; B60G 11/27;
(Continued)

(56) References Cited

U.S. PATENT DOCUMENTS 4,694,238 A * 9/1987 Norton .................. H02J 7/1438
322/28
5,021,727 A * 6/1991 Mashino ............... H02J 7/1438
322/28
(Continued)

FOREIGN PATENT DOCUMENTS

CN    10220292 B    9/2011
CN    103906633 A   7/2014
(Continued)

OTHER PUBLICATIONS

European Patent Office; International Search Report; dated Jan. 31, 2107.
(Continued)

*Primary Examiner* — Anthony D Wiest
(74) *Attorney, Agent, or Firm* — Price Heneveld LLP

(57) ABSTRACT

A high speed actuation system for protracting and retracting a retractable wheel and/or track drive assembly of an amphibian includes an actuator, at least one retractable wheel and/or track drive assembly comprising at least one wheel and/or track drive supported directly or indirectly by a suspension assembly and movable between a protracted and retracted positions, an energy source for providing power to the actuator, and a controller that controls in
(Continued)

amount the power provided by the energy source to the actuator such that the time of actuation to retract the at least one retractable wheel and/or track drive assembly from a protracted position to a retracted position, or to protract the at least one retractable wheel and/or track drive assembly from a retracted position to a protracted position, is less than 5 seconds.

8 Claims, 2 Drawing Sheets

(51) Int. Cl.
    *B60G 11/27*     (2006.01)
    *B60G 15/00*     (2006.01)

(52) U.S. Cl.
    CPC .......... *B60G 15/00* (2013.01); *B60G 2202/13* (2013.01); *B60G 2202/152* (2013.01); *B60G 2202/30* (2013.01); *B60G 2300/28* (2013.01)

(58) Field of Classification Search
    CPC .......... B60G 2202/152; B60G 2202/30; B60G 15/00; B60G 11/18
    See application file for complete search history.

(56) References Cited

U.S. PATENT DOCUMENTS

| | | | |
|---|---|---|---|
| 5,225,761 A * | 7/1993 | Albright | H02J 7/1423 |
| | | | 320/117 |
| 6,430,692 B1 * | 8/2002 | Kimble | G06F 1/263 |
| | | | 307/66 |
| 2013/0203304 A1 | 8/2013 | Jenkins | |
| 2013/0217280 A1 | 8/2013 | Gibbs et al. | |

FOREIGN PATENT DOCUMENTS

| | | |
|---|---|---|
| WO | 0244006 | 6/2002 |
| WO | 2006043088 | 4/2006 |

OTHER PUBLICATIONS

United Kingdom Intellectual Property Office; Search Report under Section 17; dated Mar. 9, 2016.

Chinese Intellectual Property Office; Search Report; dated Jan. 22, 2020.

* cited by examiner

HIGH SPEED ACTUATION SYSTEM, APPARATUS AND METHOD FOR PROTRACTING AND RETRACTING A RETRACTABLE WHEEL ASSEMBLY OF AN AMPHIBIAN

BACKGROUND OF THE INVENTION

The present invention relates to a high speed actuation system, apparatus and method suitable for protracting and retracting a retractable wheel assembly of an amphibian capable of travel on land and water. More particularly, the high speed actuation system, apparatus and method is suitable for use in a high speed amphibian which is capable of high speed travel on land (on or off-road, in two, four or other wheel drive) and of planing on water.

The present invention also relates to an amphibian comprising such a high speed actuation system, apparatus and method, and to use of the high speed actuation system, apparatus and method in an amphibian.

Whilst a wheel is referred to, track drives or individual track drives (i.e. to replace a single wheel) may be used as an alternative or in combination with wheels.

Retractable wheel assemblies for use in amphibians are known in the art, and are used to lift wheels to reduce drag when operating the amphibian in marine mode on water. One or more wheel assemblies are retracted to effect a mode change from land mode to marine mode, and protracted to effect a mode change from marine mode to land mode.

In the past, designers of amphibians focussed their efforts on optimising either on-land or on-water performance. Consequently, either marine performance was sacrificed in order to give satisfactory land performance, or vice-versa. Conversely, the present applicant has preferred to design amphibians having optimised on-land and on-water performance. To this end, the applicant has developed systems, apparatus and methods designed to enhance this optimisation, and the high speed actuation system, apparatus and method according to the present invention is another example of this optimisation.

SUMMARY OF THE INVENTION

In particular, the applicant has developed a particular optimisation in the speed of wheel retraction and wheel protraction on mode change from land mode to marine mode, and vice-versa. This ensures that mode change on entry into water, and egress therefrom, is achieved quickly and controllably. This improved speed of transition between modes helps make the transition seamless, minimising the effect of environmental difficulties that a driver or rider of the amphibian may encounter, such as dealing with unexpected or strong water currents, wind effects, underwater obstacles, and/or other marine or land traffic.

Furthermore, the applicant has developed this particular optimisation for particular use in high speed amphibians having retractable suspension assemblies that provide for improved suspension (and thus road handling when the amphibian is operated on land), and has done so by providing for increased wheel retraction in marine mode, yet with improved ground clearance in land mode to provide more flexibility and utility in terms of the off-road capability for use of the high speed amphibian on land. The need to retract and protract wheel assemblies reliably in a manner that can deal with extremes of normal and shock loading with off-road use, particularly in a large and/or heavily loaded amphibian, presents significant problems in terms of suspension performance, ground clearance, packaging, weight distribution and also in terms of how the resulting power transmission pathways and steering can be realised and effected.

The present invention provides a high speed actuation system, apparatus and method for protracting and retracting a retractable wheel assembly which addresses these conflicting requirements, and does so without compromising suspension performance, ground clearance, packaging, weight distribution and is still able to realise the power transmission pathways and steering functions necessary.

The power for wheel retraction and protraction is provided by the amphibian's on-board systems, and heretofore there have been practical limitations on how it can be applied to the wheel retraction and protraction system. It can also be beneficial if the engine or other prime mover does not need to run in order to retract or protract the wheels. The primary source of energy for wheel retraction and protraction is electrical, and this is either used to directly power a motor, or to drive a hydraulic pump or air compressor, which in turn acts on an actuator (electric, hydraulic, pneumatic, etc.). In general, the speed of retraction and protraction is limited by the rate at which electrical (or other) energy can be supplied. A pneumatic (air and/or gas) system has the advantage that energy can be stored in the form or compressed air and/or gas, and then applied rapidly, but improved control is necessary to refine the smoothness of the wheel retraction and protraction to avoid jerky or erratic motion, and the rate of power applied to wheel retraction and protraction movement is limited by both the electrical power rate to the pneumatic compressor/pump and also the conversion rate and efficiency of electrical power to pneumatic power, this conversion introducing losses at higher pressures and flow rates. A hydraulic system provides for a more smooth and controlled motion, but again the rate of power applied to wheel retraction and protraction movement is limited by both the electrical power rate to the hydraulic motor/pump, and also the conversion rate and efficiency of electrical power to hydraulic power, this conversion introducing losses at higher pressures and flow rates. An electrical system (using retraction motors) can, in theory, give the best transfer of stored (electrical) energy to wheel retraction and protraction motion as with the least number of losses in the process but, in practical terms, there are limitations on the vehicle's supply voltage and maximum allowable current.

The present invention addresses the above problems by providing an improved on-board power system, preferably electrical, yet does so without compromising or preventing use of a conventional 12V primary electrical system used in the art to power the vast majority of automotive and powersports vehicles. For the overall on-board vehicle electrical system used in the amphibian, the classic 12V system is preferred for incorporation of normal components such as engine management computers, fans, pumps, lighting, etc., the majority of which require a nominal 12V supply. However, for loads that require a higher electrical power, the 12V voltage is a limitation. This is due to the Power=Voltage× Current relationship. Current is typically a limiting factor in terms of heat generation and its effect on components and wiring (e.g. cable sizes). If voltage supply is increased to serve the wheel retraction and protraction system, then the power delivered could be increased for a given current limit. However, it is not practical to increase the entire vehicle system voltage due to its dependence on existing 12V componentry and wiring. The present invention provides, in its electrical embodiment, a split electrical system, whereby a battery and switching system is employed to give both i) a classic 12V vehicle wide function, and ii) a 24V "boost" function for the high speed actuation to protract or retract a retractable wheel assembly of the amphibian (electrically, pneumatically or hydraulically), while iii) utilizing existing charging means to replenish the system energy storage means (e.g. electrical/battery accumulators, or pneumatic, hydraulic accumulators).

Accordingly, in a first aspect, the present invention provides a high speed actuation system for protracting and retracting a retractable wheel and/or track drive assembly of an amphibian, the high speed actuation system comprising:
 an actuator;
 at least one retractable wheel and/or track drive assembly comprising at least one wheel and/or track drive supported directly or indirectly by a suspension assembly and movable between a protracted position and a retracted position;
 an energy source for providing power to the actuator to retract or protract the at least one retractable wheel and/or track drive assembly; and
 a controller, wherein:
 the controller controls in amount the power provided by the energy source to the actuator such that the time of actuation to retract the at least one retractable wheel and/or track drive assembly from a protracted position to a retracted position, or to protract the at least one retractable wheel and/or track drive assembly from a retracted position to a protracted position, is less than 5 seconds.

In a further aspect, the present invention provides a high speed actuation system for protracting and retracting a retractable wheel and/or track drive assembly of an amphibian, the high speed actuation system comprising:
 an actuator;
 at least one retractable wheel and/or track drive assembly comprising at least one wheel and/or track drive supported directly or indirectly by a suspension assembly and movable between a protracted position and a retracted position;
 an energy source for providing power to the actuator to retract or protract the at least one retractable wheel and/or track drive assembly; and
 a controller, wherein:
 the controller controls in amount the power provided by the energy source to the actuator such that a boosted power is made available to the actuator for moving the at least one retractable wheel and/or track drive assembly between a protracted position and a retracted position or a retracted position and a protracted position.

In a further aspect, the present invention provides an amphibian comprising a high speed actuation system as set forth herein.

In a further aspect, the present invention provides use of a high speed actuation system as set forth herein.

In a further aspect, the present invention provides a method of high speed actuation for protracting and retracting a retractable wheel and/or track drive assembly of an amphibian, the method of high speed actuation comprising:
 providing an actuator;
 providing at least one retractable wheel and/or track drive assembly comprising at least one wheel and/or track drive supported directly or indirectly by a suspension assembly and which is movable between a protracted position and a retracted position;
 providing an energy source for providing power to the actuator to retract or protract the at least one retractable wheel and/or track drive assembly; and
 providing a controller, wherein:
 the controller controls in amount the power provided by the energy source to the actuator such that the time of actuation to retract the at least one retractable wheel and/or track drive assembly from a protracted position to a retracted position, or to protract the at least one retractable wheel and/or track drive assembly from a retracted position to a protracted position, is less than 5 seconds.

In a further aspect, the present invention provides a method of high speed actuation for protracting and retracting a retractable wheel and/or track drive assembly of an amphibian, the method of high speed actuation comprising:
 providing an actuator;
 providing at least one retractable wheel and/or track drive assembly comprising at least one wheel and/or track drive supported directly or indirectly by a suspension assembly and which is movable between a protracted position and a retracted position;
 providing an energy source for providing power to the actuator to retract or protract the at least one retractable wheel and/or track drive assembly; and
 providing a controller, wherein:
 the controller controls in amount the power provided by the energy source to the actuator such that a boosted power is made available to the actuator for moving the at least one retractable wheel and/or track drive assembly between a protracted position and a retracted position or a retracted position and a protracted position.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
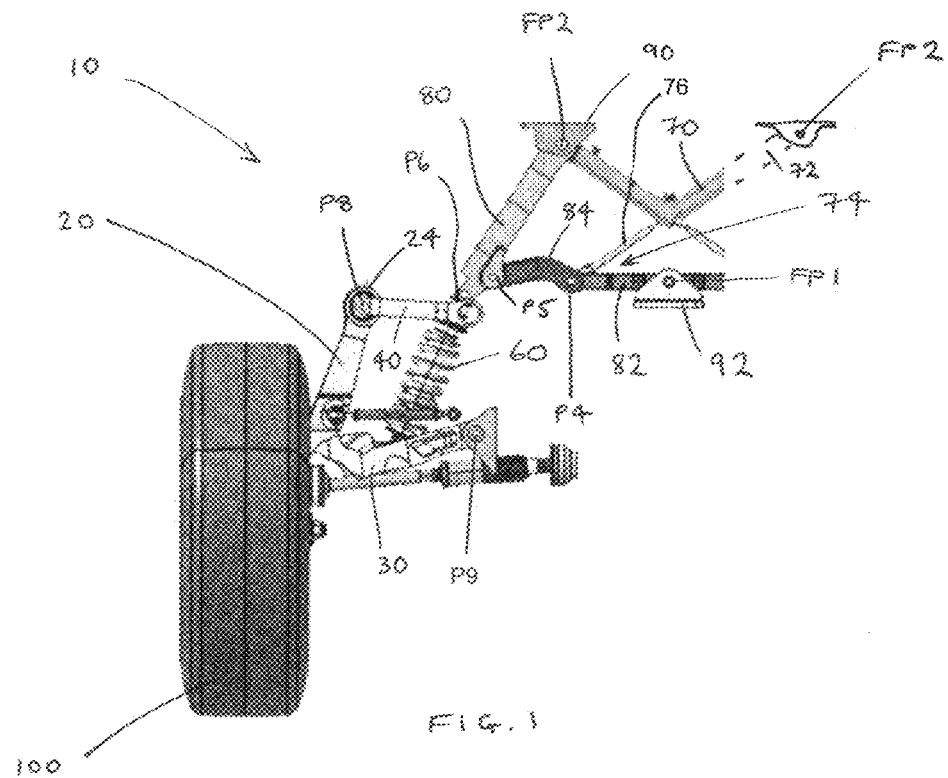
FIG. 1 is a schematic rear elevation view showing, by way of example only, a port front retractable wheel assembly apparatus in a protracted position and suitable for use in the present invention (certain components omitted for clarity)
Figure 2:
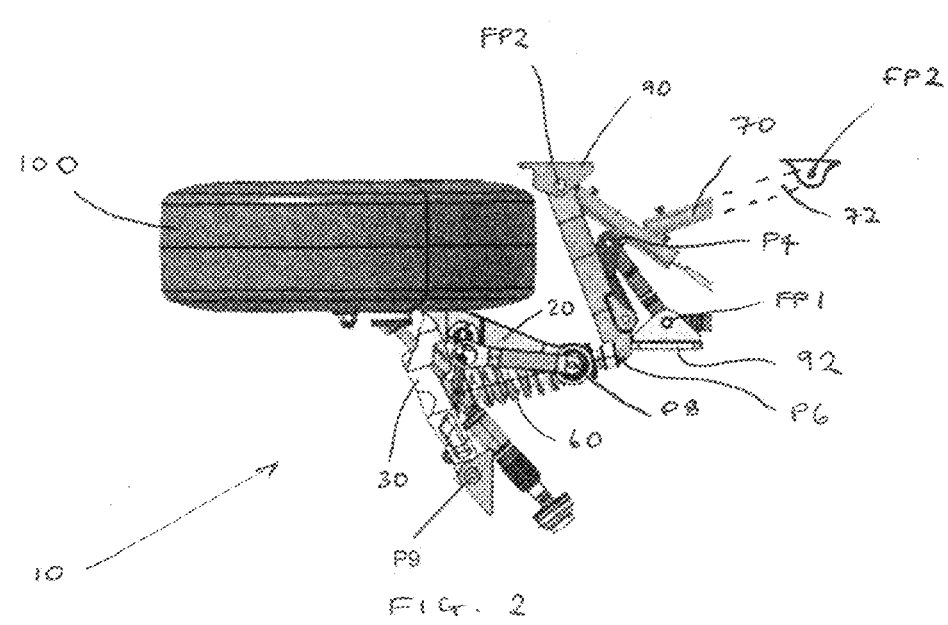
FIG. 2 is a schematic rear elevation view of the retractable wheel assembly of FIG. 1 in a retracted position (certain components omitted for clarity)

Referring first to FIGS. 1 and 2, there is shown a retractable wheel assembly 10 for use in an amphibian. The retractable wheel assembly 10 can be used for a steerable wheel 100, as shown in FIGS. 1 and 2, or for a non-steerable wheel (not shown). Further, the retractable wheel assembly 10 can be used for a driven wheel or non-driven wheel, and is shown in the Figures in the context of a driven (or selectively driveable) wheel. The amphibian (not shown) includes a prime mover (not shown) for providing power where required to drive one or more of the wheels (or track drive(s)) supported on each retractable wheel assembly 10. The prime mover may also provide power to drive a marine propulsion unit for propelling the amphibian on water. The wheel 100 is rotatably connected to a suspension upright 20 (sometimes termed a hub carrier or, when steerable, a knuckle) via a wheel hub. A suspension assembly is provided by way of a suspension upright 20, suspension control arms 30, 40 and a spring damper suspension strut 60. The suspension strut 60 may take any suitable alternative form, such as a hydropneumatic strut, a gas spring strut or an air spring strut, for example. The suspension upright 20 has a first upper end 24 pivotably connected to the outboard end of an upper control arm 40 via a pivot P8, and a second lower end distal from the first upper end 24 and provided with the wheel hub for receiving a wheel. Between the first upper end 24 and the second lower end, the suspension upright 20 is pivotably connected to the outboard end of a lower control arm 30 via a pivot. As shown, the suspension upright 20 is steerable (a knuckle) about the upper and lower control arms 40, 30, and this connection is realised by way of oversized ball joints which serve as pivots therebetween which have been machined to a "waisted" shape to provide the necessary degree of articulation required both for steering and retraction. The upper and lower control arms 40, 30 can take any suitable form, and for example may preferably take the form of wishbone shaped arms (bifurcated) with the apex of each arm connected to the suspension upright 20 via the respective pivots. The inboard ends of the bifurcated upper control arm 40 are pivotably connected to the amphibian (not shown), and the inboard ends of the lower control arms 30 are pivotably connected to the amphibian, the pivots comprising polyurethane bushes. The upper control arm 40 is shorter than the lower control arm 30. The pivots of the inboard ends of the lower and upper control arms 30, 40 are fixedly located in position on the amphibian, save for rotation about their pivot axis (i.e. are free to pivot, but not free to undergo any substantial translational movement). A retraction linkage is provided and comprises a top mounting 90, a central mounting 92, an electric actuator 70, a retraction arm 80, a lever 82 and a cranked (angled) lever 84, the retraction linkage being used to effect controlled retraction and protraction of the suspension assembly of the retractable wheel assembly 10. The non-actuating end of the electric actuator 70 is pivotably connected to the amphibian (not shown) via a fixed pivot FP2 of the top mounting 90, while the actuating rod end 74 of an actuating rod of the electric actuator 70 is pivotably connected with the respective second ends of the lever 82 and the cranked lever 84 via a pivot P4. Fixed pivot FP2 is fixedly located in position on the amphibian, save for rotation about its pivot axis. A first end of lever 82 is fixedly located in position on the amphibian via a fixed pivot FP1 of the central mounting 92, save for rotation about its pivot axis, while the second end of lever 82 is capable of translation and of rotation about the pivot axis of pivot P4. Similarly, the second end of cranked lever 84 is capable of translation and of rotation about the pivot axis of pivot P4. A first end of cranked lever 84 is connected to a lower end of the retraction arm 80 via a pivot P5 and is capable of translation and of rotation about the pivot axis of pivot P5. An upper end of retraction arm 80 is pivotably connected to the amphibian (not shown) via a fixed pivot FP2 of the top mounting 90, while the lower end of retraction arm 80 is additionally pivotably connected with the upper end of the spring damper suspension strut 60 via a pivot P6. The spring damper suspension strut 60 comprises a lower end connected to the lower control arm 30 via a pivot. The upper and lower control arms 40, 30, the suspension upright 20 and the spring damper suspension strut 60 may, if preferred, together form a double wishbone suspension unit. Of course, double wishbone suspension units are well known in road only going vehicles and provide good levels of road holding ability. The ride handling characteristics of this layout are well known, and so can be adapted or tuned to the specific requirements of the amphibian, in order to provide a comfortable ride and/or good cornering capabilities, and/or good off road capability.

The retraction linkage arrangement enables the retractable wheel assembly 10 to rigidly support the suspension assembly in a protracted position to allow the suspension assembly to function when the amphibian is operated on land. The retraction linkage assembly of the retractable wheel assembly 10 is further operable to retract the suspension assembly along with the wheel when the amphibian is operated on water, such that the wheel can retract, preferably by at least 45, 75, 90 degrees or more.

All of the pivots FP1, FP2, P4, P5, P6, P8, P9 (and others not shown) allow for relative rotational movement of the attached members, generally in substantially the same plane or parallel planes. Further, the pivots FP1, FP2, P4, P5, P6, P8, P9 (and others not shown) rotate about axes each generally or substantially parallel to a longitudinal axis of the amphibian at least. This arrangement provides for wheel retraction about a longitudinal axis of the amphibian, and for steering of the suspension upright 20 (knuckle) for the front wheels.

A wheel 100, when attached to the wheel hub, is therefore secured to the amphibian via the retractable wheel assembly 10 at multiple points, including FP1, FP2 at least, at least some of which are spaced with respect to another along the longitudinal axis of the amphibian. The resulting wheel retraction assembly is therefore configured to withstand the forces experienced by the wheel even in off-road conditions when operated on land.

Figure 3:
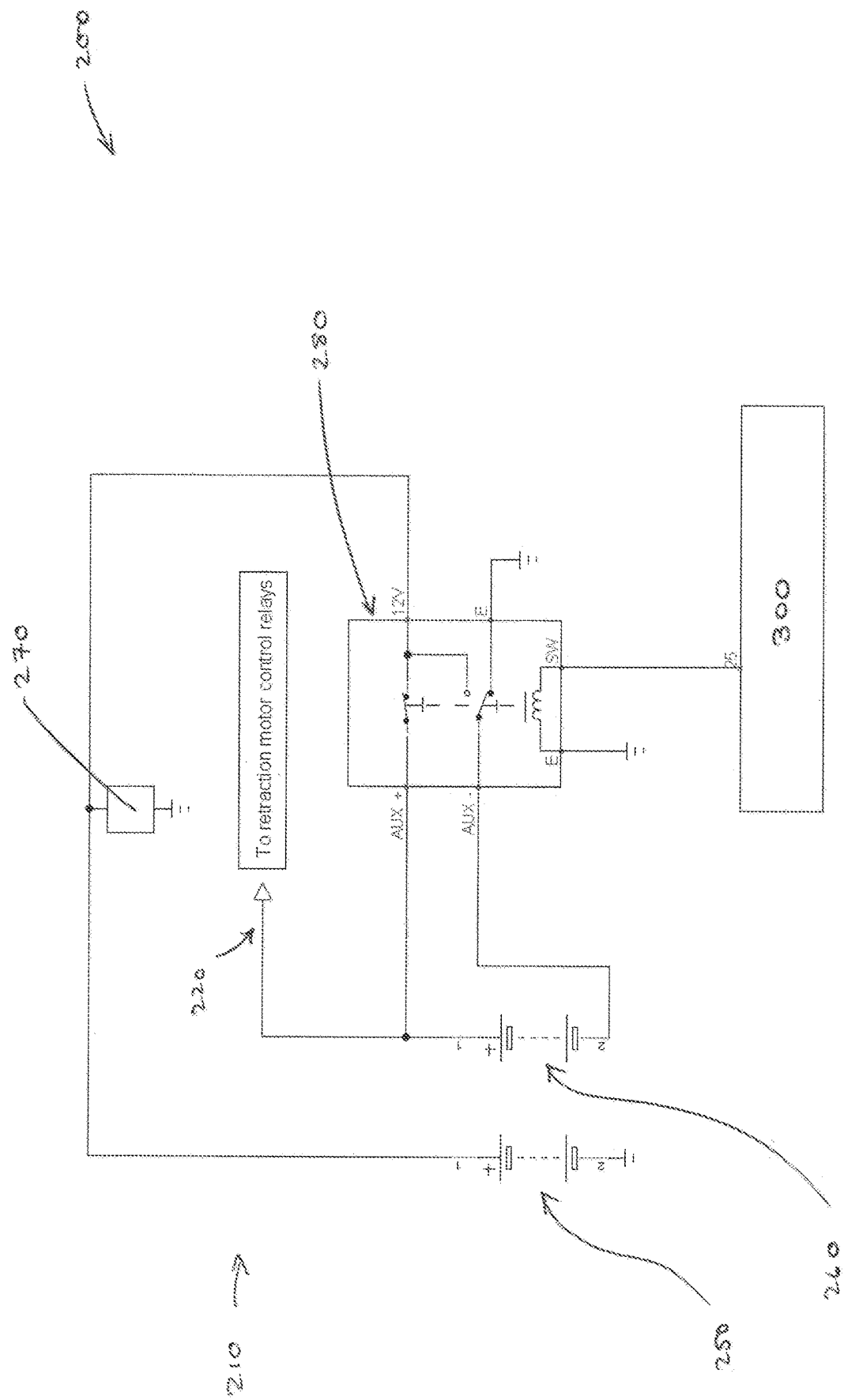
FIG. 3 is a schematic diagram illustrating a preferred embodiment of control system of the high speed actuation system, apparatus and method according to the present invention (certain components omitted for clarity).

With reference next to FIG. 3, there is shown a schematic diagram illustrating a first preferred embodiment of control system 200 of the high speed actuation system, apparatus and method according to the present invention. The control system 200 comprises two 12V batteries, a primary 12V battery 250 and a secondary 12V battery 260. A main 12V electrical system circuit 210, including charging via alternator/generator 270, is permanently connected to the primary 12V battery 250. The wheel retraction and protraction electrical power system circuit 220 is separable from the main 12V electrical system circuit 210. A ground connection is made to the ground connection of the primary 12V battery 250. The 24V "boost" mode connection is made to the +ve terminal on the secondary 12V battery 260. The primary and secondary 12V batteries 250, 260 are connected to each other via a battery relay system 280.

Operation of the control system 200 will now be described. In operation on land or on water (with no mode change requiring retraction or protraction), the battery relay system 280 couples the primary and secondary 12V batteries 250, 260 in parallel. This means both the primary and secondary 12V batteries 250, 260 are connected equally to the main 12V electrical system circuit 210 and vehicle supply, and will be charged properly (and evenly) by the alternator/generator 270. When the retract or protract function is demanded via controller 300, the battery relay system 280 uncouples the secondary 12V battery 260 from its parallel connection with the primary 12V battery 250, and switches instead to a series connection with the primary 12V battery 250. Consequently, the main 12V electrical system circuit 210 runs as normal off the primary battery 12V battery 250 only, while the retraction and protraction system runs off the primary and secondary 12V batteries 250, 260 in series, which achieves the 24V "boost" supply. When in this "boost" mode, the secondary 12V battery 260 is drained only, and there is no charging. However, as this continues only for a short duration, this presents no issue. When the battery relay system 280 recouples the secondary 12V battery 260 from its series connection with the primary 12V battery 250, and switches back to a parallel connection with the primary 12V battery 250, the secondary 12V battery 260 is then charged as normal. The control system 200 has the added advantage of using commonly available components in a simple and cost efficient layout, yet delivers increased power in the "boost" mode to the retraction and protraction system, providing a high speed actuation system which significantly increases the speed of wheel retraction and protraction. The speed of wheel retraction (from protracted to retracted) or of wheel protraction (from retracted to protracted) is under 5 seconds, more preferably under 4 seconds, and even more preferably of 2 seconds or under.

Operation of the components of the retractable wheel assembly 10 under the control of the control system 200 will now be described. When the amphibian is operated in a land mode (including entry into and egress from the water), the wheel retraction assembly 10 is in a fully protracted position as shown in FIG. 1, in which the wheel 100 is in contact with a road or other ground surface. The electric actuator 70 is extended and may be locked in position, electrically or mechanically or both, so that the wheel retraction assembly 10 remains in position. Loads experienced by and transferred from the wheel 100 mounted on the wheel hub are transmitted via the suspension upright 20 and on through the lower control arm 30 via a pivot to the lower end of the spring damper suspension strut 60. The spring damper suspension strut 60 is constrained at its upper end by pivot P6 located in a primary lock out overcentre OCP position, thereby resisting axial movement by virtue of the mechanical lock provided by the retract arm 80 which is held in place by fixed pivot FP2 and the remaining components of the retraction linkage assembly (including, optionally, electrically locked electric actuator 70, but any suitable form of lock may be employed (e.g. mechanical, electromechanical, pin, magnetic, etc.)). The non actuating end 72 of the electric actuator 70 is fixed in position (but pivotable) by virtue of its connection to the amphibian (not shown) via pivot FP2, while the actuating rod end 74 of the electric actuator 70 is pivotably connected (and can move in terms of axial extension and retraction) to the secondary overcentre position OCS of lever 82 and cranked lever 84 via pivot P4. As such, all bump and rebound is transmitted to and attenuated by the spring damper suspension strut 60. The received forces act along the longitudinal axis of the spring damper suspension strut 60, which at its upper end is biased towards and on the overcentre side, acting to urge the retractable wheel assembly further overcentre and not in a direction which seeks to force a retraction of the wheel retraction assembly. As the amphibian is driven, the suspension assembly acts in a known manner. In bump travel, the wheel retraction assembly 10 remains locked in place in an overcentre condition OCP, providing fixed inboard pivot points for the double wishbone suspension unit. The wheel 100 will be urged upwardly by the bump in the road or ground surface. Upper control arm 40 and lower control arms 30 will rotate upwardly about fixed inboard pivot points. Upper control arm 40 is shorter than lower control arms 30, so that the upward movement of the wheel results in a small camber change of the wheel towards an inboard side of the amphibian, and this aids road/ground holding. The spring damper suspension strut 60 is partially compressed during part bump travel, and resists the upward movement of the wheel to keep the wheel 100 in contact with the road/ground.

It will be appreciated, therefore, that during bump travel the retractable action of the retractable wheel assembly 10 is locked stationary, and the function of the suspension assembly is not compromised or affected by the ability of the retractable wheel assembly 10 to retract the wheel 100 in marine mode.

The longer length of the lower control arm 30 relative to the upper control arm 40, coupled with the relatively long length of the suspension upright 20, provides for long vertical travel of the retractable wheel assembly on retraction, allowing the wheel to be retracted above the waterline of the amphibian, even when a deep V-hull is employed and is cornering. The amphibian is able to plane on water without drag caused by the wheel.

For protraction of the wheel, the protraction process is actuated by extension of the electric actuator 70 by supplying 24V "boost" mode electrical energy to the electric actuator 70. The retraction process described above is essentially operated in reverse, and finishes with the upper end of the spring damper suspension strut 60 being pushed laterally outboard around an arc, and passing through a centre to the primary overcentre position OCP where the wheel retraction assembly is locked as described above.

The retractable wheel assembly provides substantial lifting capability. It may, therefore, in certain circumstances (e.g. if the amphibian is beached or runs aground) be possible for the wheels to be protracted to lift the amphibian upwards. Since the rotational axis of the wheels is close to parallel to the ground during the final stages of deployment, the amount of tyre scrub in such a deployment is kept low.

Each feature disclosed in this specification (including the accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of any method or process so disclosed, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

For example, electric actuator 70 may take any suitable form of actuator, e.g. hydraulic, pneumatic and/or hydraulic and/or any hybrid thereof. Consequently, energy storage and release may be effected by accumulators which are electrical (e.g. batteries or capacitors) or hydraulic or pneumatic accumulators. Similarly, the spring damper suspension strut 60 may take any suitable form, such as torsion bar and damper system, hydropneumatic units and/or gas or air springs and/or any hybrid thereof. Whilst wheels have been described throughout as the land propulsion means, track drives or individual track drives (i.e. to replace a single wheel) may be used as an alternative or in combination with wheels.

The invention claimed is:

1. An actuation system for protracting and retracting a retractable wheel and/or track drive assembly of an amphibian, the actuation system comprising:
   an actuator;
   at least one retractable wheel and/or track drive assembly comprising at least one wheel and/or track drive supported directly or indirectly by a suspension assembly and movable between a protracted position and a retracted position;
   an energy source for providing power to the actuator to retract or protract the at least one retractable wheel and/or track drive assembly; and
   a controller, wherein:
      the controller controls in amount the power provided by the energy source to the actuator such that the time of actuation to retract the at least one retractable wheel and/or track drive assembly from a protracted position to a retracted position, or to protract the at least one retractable wheel and/or track drive assembly from a retracted position to a protracted position, is less than 5 seconds; and
      wherein the energy source has a primary power output mode and a secondary or boost power output mode, the secondary or boost power output mode making available an increased amount of power to actuate the at least one retractable wheel and/or track drive assembly between the retracted and protracted positions, as compared to the power made available in the primary power output mode to operate the amphibian while the at least one retractable wheel and/or track drive assembly is not being actuated between the retracted and protracted positions.

2. The actuation system as claimed in claim 1, wherein the energy source is electrical.

3. The actuation system as claimed in claim 1, wherein the energy source is electrical and the primary power output mode is operable at 12V and the secondary or boost power output mode is operable at 24V.

4. The actuation system as claimed in claim 1, wherein the energy source comprises two 12V batteries configured to provide the primary power output mode operable at 12V by connecting the two 12V batteries in parallel, and configured to provide the secondary or boost power output mode operable at 24V by connecting the two 12V batteries in series.

5. The actuation system as claimed in claim 4, wherein the controller controls the parallel or series connection of the two 12V batteries.

6. The actuation system as claimed in claim 4, wherein the controller controls the parallel or series connection of the two 12V batteries using a relay.

7. The actuation system as claimed in claim 1, wherein the secondary or boost power output mode makes available an increased amount of power to the actuator under the action of the controller.

8. The actuation system as claimed in claim 1, wherein the controller controls in amount a primary power available to other components.

* * * * *